United States Patent
Mortz et al.

(10) Patent No.: US 7,691,490 B2
(45) Date of Patent: Apr. 6, 2010

(54) LONG PERSISTENT PHOSPHOR INCORPORATED WITHIN A FABRIC MATERIAL

(76) Inventors: Bradford K Mortz, 29815 N. 43rd Way, Cave Creek, AZ (US) 85331; Robert H Miller, 47517 Putney Ct., Canton, MI (US) 48188

( * ) Notice: Subject to any disclaimer, the term of this patent is extended or adjusted under 35 U.S.C. 154(b) by 1455 days.

(21) Appl. No.: 10/149,467

(22) PCT Filed: Dec. 7, 2000

(86) PCT No.: PCT/US00/42693
§ 371 (c)(1),
(2), (4) Date: Feb. 19, 2003

(87) PCT Pub. No.: WO01/42385
PCT Pub. Date: Jun. 14, 2001

(65) Prior Publication Data
US 2004/0126615 A1     Jul. 1, 2004

(51) Int. Cl.
*C09K 11/55* (2006.01)
*B05B 5/00* (2006.01)

(52) U.S. Cl. ............ 428/690; 428/323; 427/157; 252/301.35; 252/301.4 R; 252/301.4 S

(58) Field of Classification Search .......... 428/378, 428/690, 372, 394, 395; 252/301.4 S, 301.35, 252/301.36, 301.16, 301.33; 442/74, 75
See application file for complete search history.

(56) References Cited

U.S. PATENT DOCUMENTS

| | | | |
|---|---|---|---|
| 3,803,437 A | 4/1974 | Robinson | 313/108 R |
| 4,229,673 A | 10/1980 | McAllister | 313/225 |
| 4,572,803 A | 2/1986 | Yamazoe et al. | 534/16 |
| 4,781,647 A * | 11/1988 | Doane, Jr. | 446/219 |
| 5,731,658 A | 3/1998 | Lengyel et al. | 313/486 |
| 5,839,718 A | 11/1998 | Hase et al. | 252/301.4 |
| 5,903,340 A | 5/1999 | Lawandy et al. | 356/71 |
| 5,914,076 A * | 6/1999 | Schloss | 264/21 |
| 6,071,432 A * | 6/2000 | Yocom et al. | 252/301.4 S |
| 6,339,224 B1 * | 1/2002 | Takahara et al. | 250/486.1 |
| 6,692,667 B2 * | 2/2004 | Kyeng-Jung | 264/21 |

* cited by examiner

Primary Examiner—D. Lawrence Tarazano
Assistant Examiner—Camie S Thompson
(74) Attorney, Agent, or Firm—Avery N. Goldstein

(57) ABSTRACT

A process for incorporating a long persistent phosphor into a fabric material which occurs by firing a phosphor within a crucible, then grinding the resulting aggregate into a phosphor particulate of specified size, encapsulating the phosphor particulate within a water impervious coating material and then applying a specified ratio by weight of the encapsulated phosphor particulates into the fabric material. Further, a fibrous product is described incorporating encapsulated long persistent phosphor particles.

20 Claims, 1 Drawing Sheet

LONG PERSISTENT PHOSPHOR INCORPORATED WITHIN A FABRIC MATERIAL

JOINT RESEARCH AGREEMENT PARTIES

The work resulting in this patent occurred through research activities undertaken subject to a Joint Research Agreement between Luminiphor Technologies, Inc. and Sarnoff Corporation, and a Joint Research Agreement between Luminiphor Technologies, Inc. and Global Products Sales and Marketing, LLC.

BACKGROUND OF THE INVENTION

1. Field of the Invention

The present invention relates generally to phosphorescent based materials and, more particularly, to a process and product by process for incorporating a long persistent phosphor within a fabric material.

2. Description of the Prior Art

Various types of phosphor materials are well known in the art and which provide varying degrees of persistent luminescence. A common objective of phosphor materials is to provide an application for a luminescent light source which takes advantage of intermittent light irradiation and/or the absence of irradiating light on a continuous basis.

While the existence of phosphor materials such as above is fairly well known in the art, the recent trend has been to identify useful applications of persistent phosphor which will enable the production of production of sufficient light illumination following an iterative period of light irradiation.

SUMMARY OF THE INVENTION

In order to incorporate a long persistent phosphor into a fabric material a process is detailed of incorporating a long persistent phosphor into a fabric material which occurs by firing a doped phosphor, grinding the resulting phosphor into a phosphor particulate of specified size, encapsulating the phosphor particulate within a water impervious coating material and then applying a specified ratio by weight of the encapsulated phosphor particulates to the fiber host material.

Further, a fibrous product is described incorporating encapsulated long persistent phosphor particles.

Also provided is a fibrous product obtainable by the described process of incorporating a long persistent phosphor into a fiber host material.

BRIEF DESCRIPTION OF THE DRAWINGS

Reference will now be made to the attached illustration, when read in combination with the following detailed description, wherein like reference numerals refer to like parts throughout the several views, and in which.

DETAILED DESCRIPTION OF THE PREFERRED EMBODIMENTS

Figure 1:
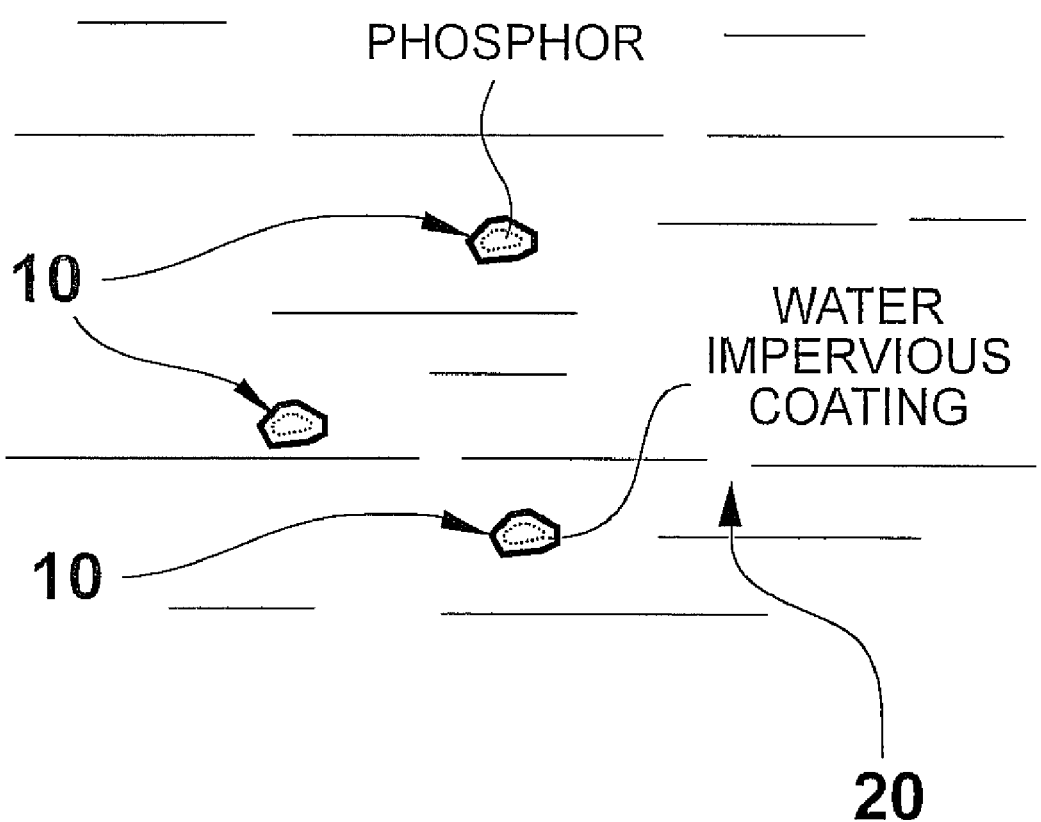
FIG. 1 is a schematic of the production of a fabric host material incorporating the long persistent phosphor according to the present invention.

The present invention is a process, as well as a product produced by a process, for incorporating a long persistent phosphor within a fabric host material. A significant number of different fabric fibrous materials are capable of being utilized with the phosphorescent material. Without limitation, fibers may include nylon, rayon, man-made fibers, natural fibers such as cotton, wool, jute, linen, silk, polyester fibers, polyalkylene fibers and plastic fibers, cellulose, cellulose acetate, polyamide, acetate, acrylic, polyacrylics, aramid, azlon, modacrylic, nonoloid, nytril, olefin, SPANDEX®, vinal, vinyon, rubber, polybutadiene, composite fibers such as Rhovyl Eco which is a composite of vinyl fiber and wool manufactured by Rhovyl.

The long persistent phosphorescent material is constituted by any of a number of various chemical compositions as are known in the art. As used herein "long persistence" is defined to mean a phosphorescence lifetime greater than 1 minute. The phosphor is typically provided as a powderized or granulate material and, in one instance, may include a lime green phosphor produced under the commercial name Nemoto Luminova and consisting of a strontium aluminate material. Additional Luminova colors include blue and which is constituted by a recipe of a Calcium Strontium Aluminate, and which is doped with Europium.

Other phosphors may specifically include a strontium sulfide material which is fired in an inert crucible at a selected elevated temperature and for a determined time period. To achieve the desired level of long persistence, as well as a given color, a dopant is added to the phosphor. While dopant precursors are typically slurried with phosphor precursors prior to firing it is appreciated that dopants are also intercalated into a phosphor through exposing a fired phosphor to a dopant. Post-firing dopant addition illustratively occurs through solution surface coating or ion implantation. Experimentation with different dopants has determined that a Europium dopant will achieve a persistent phosphor having an orange/red color. Dopants are typically present from 0.1 to 5 atomic percent. Often it is desirous to include a second dopant to enhance persistence lifetimes or modify phosphor color. As is also well known in the art, additional types of dopants may include alumina, lanthanum oxide, lanthanides, main group metal cations, fluoride, chloride and bromide and are capable of yielding persistent phosphors having pale yellow and purple shades. Further, the use of varying percentages of Calcium with Strontium Sulfide will achieve additional color shades leading to a purer red color.

Following the crucible firing of the doped phosphor, the persistent phosphor composition is dried and is retrieved in a rock-like form. A subsequent crushing and grinding operation reduces the mean particle domain size to a preferred range of 1 to 60 microns. More preferably, the particle mean domain size is from 1 to 45 microns. Certain applications require particular sizes to be reduced to, in some instances, less than 1 micron in size. Prior to introducing the phosphorescent particles into a host material, it is desirable to coat or encapsulate them so as to ensure its long term performance. It has been found that moisture, over time, tends to degrade the ability of the phosphor to maintain its long-term performance.

Accordingly, one or more types of encapsulation techniques are employed to coat the individual phosphor granulates. A first type of encapsulation is provided by a silicon oxide applied during a firing temperature of 800° C. A fluoride material may be applied contemporaneously with or separately from the silicon oxide. Typically, a firing temperature of approximately 700° C. is best suited for application of fluoride. Other encapsulation techniques may employ organic chlorosilanes in hexane or heptane solvents. The process steps in which the encapsulation of the material is accomplished typically includes mixing the coating powder with the substrate powder in an appropriate ratio, firing the mixed powder at the prescribed temperature for a defined time, washing the fired powder to remove the uncoated portion of the core powder, and drying the washed powder. Still other encapsulation techniques employ clear water impervious materials to coat the long persistent phosphor particles. Such materials illustratively include polyurethane and epoxy-based resins. Additional encapsulation techniques are illustratively detailed in U.S. Pat. Nos. 4,710,674; 5,049,408; 5,196,229; 5,118,529; 5,113,118 and 5,220,341.

With reference again to the list of fabric materials previously recited, as well as to FIG. 1, the encapsulated phosphor particulate is illustrated at 10. The encapsulated long persistent phosphor 10 is adhered to host fibers 20 prior to the subsequent weaving into a garment or article. The encapsulated long persistent phosphor can be incorporated into the host material by chemical binding by covalent or non-covalent bonds. For example, encapsulated long persistent phosphor is coated with silane which confers a positive charge. Fibers having a negative charge will bind the silane-treated encapsulated long persistent phosphor particles. It is appreciated that the encapsulating layer can be derivatized to expose a chemical moiety capable of binding to a fiber according to the present invention the chemical moiety illustratively including carboxy, carbonyl, hydroxyl, amide, amine, amino, ether, ester, epoxides, cyanate, isocyanate, thiocyanate, sulfhydryl, disulfide, oxide, diazo, iodine, sulfonic or similar groups having chemical or potential chemical reactivity. The chemical moiety exposed on the encapsulating layer will be capable of reacting with a complementary chemical moiety exposed on the fiber, the identity of which will be obvious to one skilled in the art. In another preferred embodiment of the present invention, the encapsulated long persistent phosphor is mixed during the manufacture stage with a settable material and the settable material encapsulated long persistent phosphor mix is applied to fibers. Additional techniques for binding encapsulated particles to fiber are illustratively detailed in U.S. Pat. No. 5,607,759. Encapsulation of the phosphor particulates permits them to maintain their long persistent and rechargeable characteristics during subsequent use and exposure to the environment.

Any patents mentioned in the specification are indicative of the levels of those skilled in the art to which the invention pertains. These patents and publications are herein incorporated by reference to the same extent as if each individual publication was specifically and individually indicated to be incorporated by reference.

Having described our invention, it will become apparent that it teaches a novel and useful process and product by process for incorporating a long persistent phosphor, such as in a particulate form, within a fabric host material. Fabric host material with the incorporated long persistent phosphor are used to enhance visibility in products such as garments and accessories worn or carried by safety and rescue personnel, construction workers, bikers and children. In addition the material is used to construct safety and warning signs and apparatus such as life vests. Many and numerous additional embodiments will become apparent to those skilled in the art to which it pertains without deviating from the scope of the appended claims.

We claim:

1. A fibrous product comprising long persistent strontium based phosphor particulate encapsulated by a water-impervious silane coating binding to a surface of fiber host material through a covalent bond; and a chemical moiety extending from said coating and reactive with a complementary chemical moiety exposed on the fiber host material to form the covalent bond.

2. A fibrous product comprising long persistent strontium based phosphor particulate encapsulated by a water-impervious silane coating binding to a surface of fiber host material through a covalent bond; and a chemical moiety extending from said coating and reactive with a complementary chemical moiety exposed on the fiber host material to form the covalent bond, wherein said fiber host material is selected from the group consisting of: synthetic, natural and composite.

3. The fibrous product of claim 2 wherein said natural fiber host material is selected from the group consisting of: cotton, wool, jute, linen, silk, and hemp.

4. The fibrous product of claim 2 wherein said synthetic fiber host material is selected from the group consisting of: nylon, rayon, plastic, cellulose, cellulose acetate, polyamide, acetate, acrylic, polyacrylics, aramid, azlon, modacrylic, nonoloid, nytril, olefin, saran, spandex, vinal, vinyon, polyester, polyethylene and polybutadiene.

5. The fibrous product of claim 2 where said encapsulated long persistent phosphor particulate is incorporated at 0.1-30 weight/volume percent.

6. The fibrous product of claim 2 where said encapsulated long persistent phosphor particulate is incorporated at 5-25 weight/volume percent.

7. The fibrous product of claim 2 where said encapsulated long persistent phosphor particulate is incorporated at 10-20 weight/volume percent.

8. The fibrous product of claim 2 wherein said encapsulated long persistent phosphor particulate is ground to a mean particle domain size of 1 to 60 microns.

9. The fibrous product of claim 2 wherein said encapsulated long persistent phosphor particulate is ground to a mean particle domain size of 9 to 45 microns.

10. The fibrous product of claim 2 where said encapsulated long persistent phosphor particulate is strontium sulfide with a dopant.

11. The fibrous product of claim 10 where said dopant is europium.

12. The fibrous product of claim 1 where said chemical moiety is selected from the group consisting of: carboxy, carbonyl, hydroxyl, amide, amine, amino, ether, ester, epoxides, cyanate, isocyanate, thiocyanate, sulfhydryl, disulfide, oxide, diazo, iodine and sulfonic.

13. A fibrous product as claimed in claim 1 obtainable by a process for incorporating a long persistent phosphor within a fabric material, comprising the steps of:
   firing a doped phosphor;
   grinding said doped phosphor into a phosphor particulate of specified mean particle domain size;
   encapsulating said phosphor particulate within a water impervious coating material; and
   applying a specified ratio by weight of said encapsulated phosphor particulates to the fiber host material.

14. A fibrous product comprising long persistent strontium based phosphor particulate encapsulated by a water-impervious coating binding to a surface of fiber host material through a covalent bond further comprising a chemical moiety extending from said coating and reactive with a complementary chemical moiety exposed on the fiber host material to form the covalent bond wherein said coating is a silicon oxide.

15. A fibrous product comprising long persistent phosphor particulate encapsulated by a water-impervious organic chlorosilane coating bound to a surface of a natural fiber host material selected from the group consisting of cotton, wool, jute, linen, silk, and hemp.

16. The fibrous product of claim 15 where said encapsulated long persistent phosphor particulate is incorporated at 0.1-30 weight/volume percent.

17. The fibrous product of claim 15 wherein said encapsulated long persistent phosphor particulate is ground to a mean particle domain size of 1 to 60 microns.

18. The fibrous product of claim 15 where said encapsulated long persistent phosphor particulate is strontium sulfide with a dopant.

19. The fibrous product of claim 18 where said dopant is europium.

20. The fibrous product of claim 15 where said chemical moiety is selected from the group consisting of: carboxy, carbonyl, hydroxyl, amide, amine, amino, ether, ester, epoxides, cyanate, isocyanate, thiocyanate, sulfhydryl, disulfide, oxide, diazo, iodine and sulfonic.

* * * * *